United States Patent
Lisowsky

[11] Patent Number: 5,858,511
[45] Date of Patent: Jan. 12, 1999

[54] GROOVED FRICTION MATERIAL, METHOD OF MAKING SAME, AND WET FRICTION MEMBER USING GROOVED FRICTION MATERIAL

[75] Inventor: Bohdan Lisowsky, Troy, Mich.

[73] Assignee: Eaton Corporation, Cleveland, Ohio

[21] Appl. No.: 816,021

[22] Filed: Mar. 11, 1997

[51] Int. Cl.$^6$ .............................. B32B 3/28; F16D 13/60; B27N 3/10

[52] U.S. Cl. .................... 428/167; 428/172; 192/107 M; 192/113.36; 264/29.1; 264/29.5; 264/257

[58] Field of Search .................................. 428/167, 172, 428/704, 367, 368, 297.1; 422/21.63; 264/29.1, 29.4, 29.5, 167, 257; 192/107 M, 113.36; 188/251 R, 71.5, 71.6

[56] References Cited

U.S. PATENT DOCUMENTS

| | | | |
|---|---|---|---|
| 3,730,320 | 5/1973 | Freeder et al. | 192/107 M |
| 3,927,241 | 12/1975 | Augustin | 428/408 |
| 4,113,067 | 9/1978 | Coons et al. | 188/71.6 |
| 4,265,982 | 5/1981 | McCreary et al. | 428/608 |
| 4,291,794 | 9/1981 | Bauer | 192/107 M |
| 4,396,663 | 8/1983 | Mitchell et al. | 428/111 |
| 4,700,823 | 10/1987 | Winckler | 192/107 M |
| 5,077,130 | 12/1991 | Okuyama et al. | 428/408 |
| 5,436,042 | 7/1995 | Lau et al. | 428/33 |

Primary Examiner—Donald Loney
Attorney, Agent, or Firm—Lynn E. Cargill; Susan M. Cornwall; Loren H. Uthoff, Jr.

[57] ABSTRACT

Grooved friction materials (12 or 14) each include a single-layer pyrolytic-carbon fabric material formed of woven or nonwoven yarn strands (20 and 22). The pyrolytic-carbon fabric material (12 or 14) has a top surface (16) and a bottom surface (18), the top surface (16) having molded grooves (28) therein. The yarn strands (20 and 22) at the grooves (28) exhibit superior integrity because they are generally whole, undamaged yarn strands. Wet friction members for friction engaging mechanisms include a support member (54, 56, or 58) and at least one piece (48, 50, or 52) of grooved friction material (14) adhered to a surface of the support member. The bulk grooved friction material (14), from which the individual pieces (48, 50, or 52) are cut, is a single-layer pyrolytic-carbon fabric material formed of yarn strands (20 and 22) and has a top surface (16) with grooves (28) therein. The yarn strands (20 and 22) at the grooves (28) are generally whole and undamaged. A method for making a grooved friction material (12 or 14) includes the steps of molding a carbon-fiber fabric (10) coated with a carbon-containing polymeric material, carbonizing the molded carbon-fiber fabric, and densifying the carbonized carbon-fiber fabric with pyrolytic carbon. The molding step is performed in a die adapted to form grooves (28) in the top surface (16) of the carbon-fiber fabric (10).

34 Claims, 6 Drawing Sheets

GROOVED FRICTION MATERIAL, METHOD OF MAKING SAME, AND WET FRICTION MEMBER USING GROOVED FRICTION MATERIAL

BACKGROUND OF THE INVENTION

1. Field of the Invention

The present invention relates generally to grooved friction materials, methods of making grooved friction materials and wet friction members using grooved friction materials. More particularly, the present invention relates to grooved friction materials formed of pyrolytic-carbon fabric material, methods for making same, and wet friction members using such grooved friction materials.

2. Description of the Related Art

In industrial and automobile clutches, brakes, automatic transmissions, limited slip differentials, hoists and similar friction power transmission and energy absorption devices, the devices typically include at least two cooperating members. Generally, at least one of the cooperating members is a support member and has a friction material surface adapted to be moved into and out of frictional engagement with an opposing surface on the other cooperating member. In liquid-cooled friction power transmission or energy absorption devices, both of the cooperating members typically move in a liquid, generally some type of cooling oil, and frequently the oil is force-circulating about and between the cooperating members so as to continuously lubricate or cool them. One friction material which has the desirable characteristics for such applications is a pyrolytic-carbon fabric material.

One such pyrolytic-carbon fabric material is disclosed in U.S. Pat. No. 4,291,794, which describes one way of forming the pyrolytic-carbon fabric material by densifying a single layer of woven cloth formed of carbon yarn strands. The densification step is performed by chemical vapor deposition of pyrolytic carbon onto the woven cloth. The densified woven cloth is then bonded onto the operating surface of one or more of the cooperating members. The surface of the densified woven cloth may then be grooved by machining or grinding. The grooves allow the cooling fluid to flow between the cooperating members in a manner which is optimum for a particular application.

The prior art has some serious shortcomings. To explain, one should understand that grooving of the densified woven cloth may be beneficial regarding clutching, braking, and/or accelerating for certain devices, especially those having large friction surfaces and/or those having to dissipate large amounts of heat. The grooves allow rapid clearing of cooling fluids, such as oil, from the friction interface. However, the process of machining or grinding the grooves into the friction surface of the woven cloth is a relatively costly procedure and, in addition, damages the yarn strands of the woven cloth because it removes a significant part of the individual yarns. This damage to the yarn strands weakens the woven cloth, especially at the edges between the grooves and the non-grooved portions of the woven cloth which can seriously impair the durability of the friction material. Furthermore, machined grooves result in rough surfaces which impair oil flow. This effect yields inferior cooling capacity and/or oil clearing capacity than is desired. As the grooves are helpful for heat extraction and lubrication, it is important to achieve this effect at an optimum rate.

Therefore, the present invention seeks to provide a molded grooved friction material formed of fabric material having minimally-damaged yarn strands on the friction surface so as to enhance its performance.

Another advantage being sought by the present invention is a wet friction member for friction engaging mechanisms, the wet friction member having a molded grooved friction surface formed of fabric material having minimally-damaged yarn strands to give the full strength of the friction material, while minimizing rough, machined grooves that impair oil flow to maximize heat extraction and lubrication.

Yet another advantage being sought by the present invention is a method for making a molded grooved friction material formed of a fabric material, the grooved friction material having minimally-damaged yarn strands on the friction surface.

SUMMARY OF THE INVENTION

In accordance with the present invention, grooved friction materials (12 or 14) are disclosed, each of which includes a single-layer pyrolytic-carbon fabric material formed of non-damaged, whole woven or nonwoven yarn strands (20 and 22). The pyrolytic-carbon fabric material (12 or 14) has a top surface (16) and a bottom surface (18), the top surface (16) having grooves (28) therein. The yarn strands (20 and 22) at the grooves (28) are generally whole, undamaged yarn strands.

Also according to the present invention, wet friction members for friction engaging mechanisms are disclosed. Each of the wet friction members includes a support member (54, 56, or 58) and a piece (48, 50, or 52) of grooved friction material (14) adhered to a surface of the support member. The grooved friction material (14), from which the pieces (48, 50, or 52) are formed, is a single-layer pyrolytic-carbon fabric material formed of yarn strands (20 and 22) and has a top surface (16) and a bottom surface (18). The top surface (16) has grooves (28) therein. The yarn strands (20 and 22) at the grooves (28) are generally whole, undamaged yarn strands.

The present invention also includes a method for making a grooved friction material (12 or 14). The method includes the steps of molding a carbon-fiber fabric (10), which can be optionally coated with a carbon-containing polymeric material, followed by carbonizing the molded carbon-fiber fabric, and then densifying the carbonized carbon-fiber fabric with pyrolytic carbon. The molding is performed in a die adapted to form grooves (28) in the top surface (16) of the carbon-fiber fabric (10).

Other advantages of the present invention will be readily appreciated as the same becomes better understood after reading the subsequent description taken in conjunction with the appendant drawings.

BRIEF DESCRIPTION OF THE DRAWINGS

FIGS. 5*a*–5*c* illustrate the grooves in a radial orientation with respect to radial projections, while FIG. 5*d* shows an off-radial groove orientation, further discussed with reference to FIG. 8*b*.

DESCRIPTION OF THE PREFERRED EMBODIMENT(S)

Figure 2:
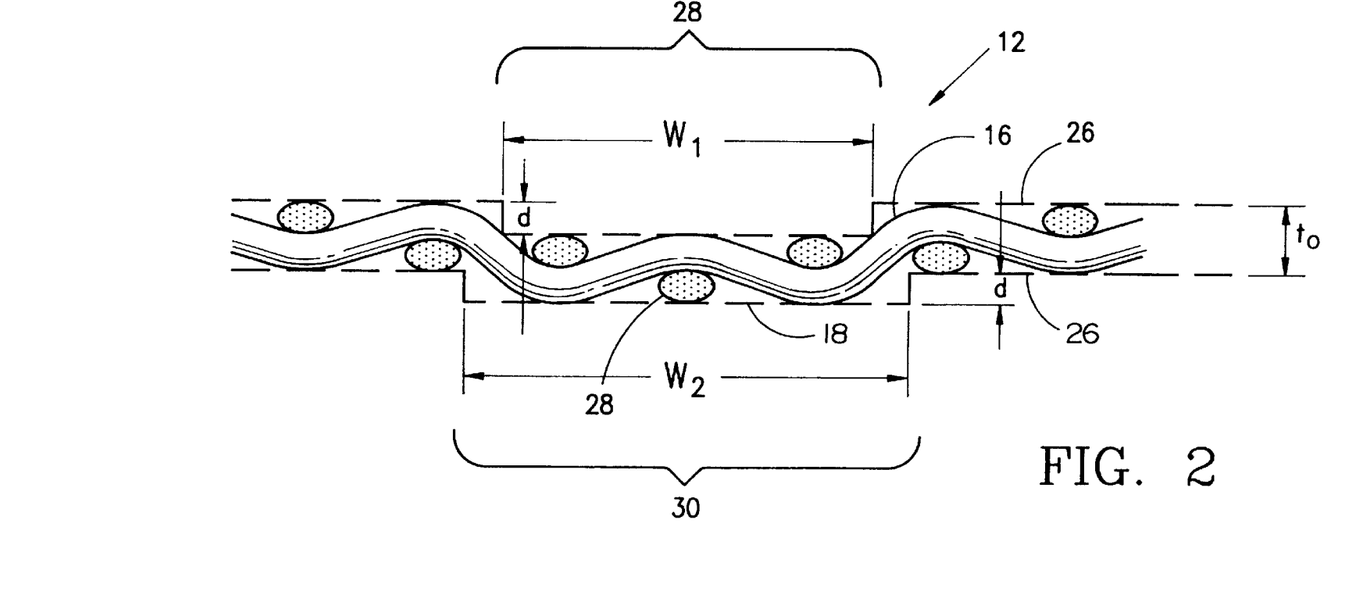
FIG. 2 is a greatly-enlarged cross-sectional view of a fabric material which has been grooved according to the present invention.
Figure 3:
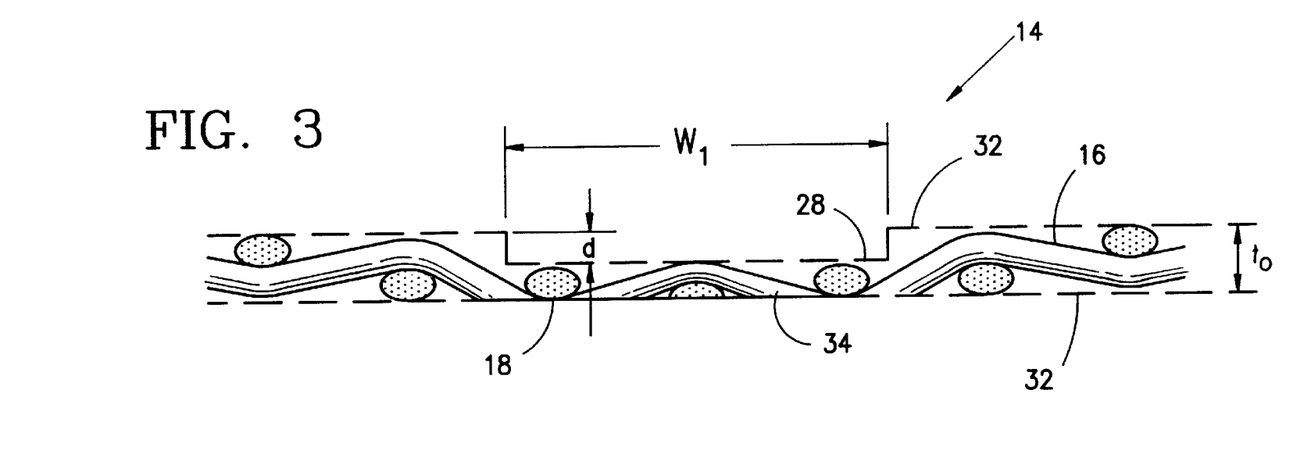
FIG. 3 is a greatly-enlarged cross-sectional view of a fabric material which has been grooved on the top surface and flattened on the bottom surface according to the present invention.

One aspect of the present invention concerns grooved friction materials which are exemplified in both FIGS. 2 and 3 and indicated by reference numerals 12 and 14, respectively. Another aspect of the present invention is a method of making grooved friction materials such as grooved friction materials 12 and 14. Yet another aspect of the present invention concerns wet friction members which use grooved friction materials. The method of making the grooved friction materials will be discussed first, and a discussion of the grooved friction materials and their uses will follow.

The method of making grooved friction materials according to the present invention generally entails molding grooves into a carbon-fiber fabric containing a carbon-containing polymeric material, carbonizing the molded carbon-fiber fabric, and at least partially densifying the carbonized carbon-fiber fabric with pyrolytic carbon. Molding the grooves into the fabric alleviates rough groove edges on the top surface, which in turn, provides a smoother oil flow path that enhances oil flow and, in turn, optimizes heat extraction and lubrication.

The carbon-fiber fabric starting material is formed of carbon fibers produced by heat treating both natural and synthetic fibers of materials, such as wool, rayon, polyacrylonitrile, and pitch, at temperatures on the order of about 1000° C. or more, e.g., 1200°–1500° C. Optionally, inorganic fibers or inorganic materials made of, e.g., silicon carbide, alumina, or carbon black, may be included in the carbon-fiber fabric. Specific fabric materials suitable for use in the present invention include HERCULES AS-4, available from Hercules, Inc., Magna, Utah, and TORAY T-300, available from Toray, Toray Industries (America), Inc. of N.Y. N.Y.

The carbon-fiber fabric may be a nonwoven fabric or a woven fabric, such as continuous-filament fabric, spun-yarn fabric, or a combination thereof. Nonwoven fabric generally refers to coherent fibrous material formed without uniform interlacing of yarn strands, such as batting or felt. Felt is a fabric formed of fibers through the action of heat and pressure. In continuous-filament fabric, the yarn strands are continuous and interlacing. Spun-yarn fabric includes some fibers of short-length (e.g. one to three inches long) which are spun into fuzzy, fluffy yarns. Woven fabric substrates used in the present invention are in the form of a single layer of fabric.

Figure 1:
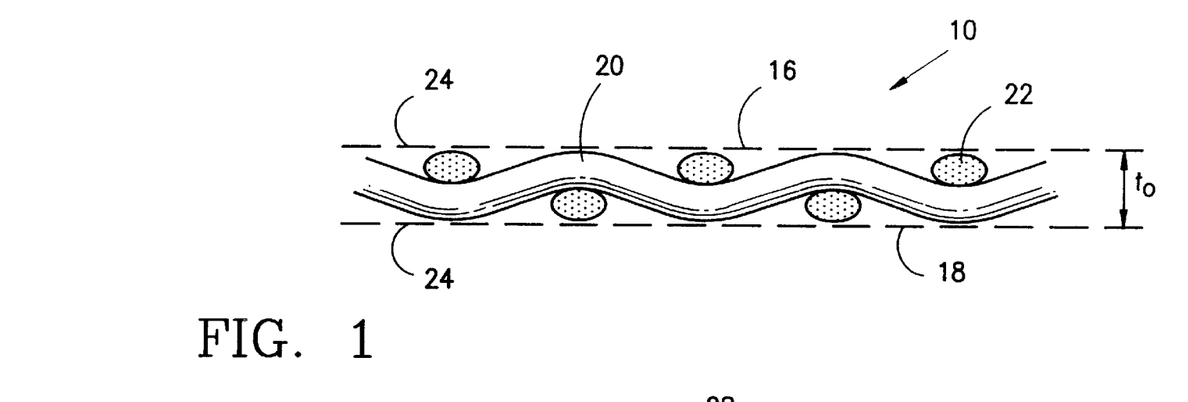
FIG. 1 is a greatly-enlarged cross-sectional view of a fabric material.

Of the three types of fabrics (continuous-filament, spun-yarn, and nonwoven), continuous-filament fabric benefits from the present invention the most. Woven fabric 10, shown in FIG. 1, is a continuous-filament fabric, has top surface 16 and bottom surface 18, is formed of interlacing warp yarn strands 20 and fill yarn strands 22, and has thickness $t_o$ and the general flat shape as defined by dashed lines 24.

The carbon-fiber fabric is preferably from about 0.001 inch to about 0.1 inch thick, more preferably, from about 0.01 to about 0.08 inch thick. It is advantageous that the carbon-fiber fabric be flexible and have light-pervious pores, many through pores and relatively large surface pores. Typically, when the fabric is continuous-filament fabric, the fabric has a bulk density of about 35% of theoretical density, and when the fabric is spun-yarn fabric, the fabric has a bulk density of about 20% of theoretical density.

It should be noted that the fabric may be cut into manageable pieces or into pieces of the desirable size and shape for the end-use applications any time during the method of the invention.

Before molding the carbon-fiber fabric, the carbon-fiber fabric is optionally coated with a carbon-containing polymeric material (not shown). The purpose of the coating is to assist in preserving the molded shape of the grooved friction material after it has been molded. The coating is not intended to provide substantial densification of the grooved friction material upon carbonization.

The carbon-fiber fabric may be coated either by coating the yarn strands which form the carbon-fiber fabric before or while the fabric is formed or by coating the carbon-fiber fabric itself. When the fabric itself is coated, only one surface of the carbon-fiber fabric needs to be coated, and it may be advantageous to have only the bottom surface coated. Whichever way the carbon-fiber fabric is coated, the coating may be performed by, e.g., spraying or immersing the yarn strands or the carbon-fiber fabric into a solution of the carbon-containing polymeric material.

The coating procedure may be performed in a continuous manner either when the fabric is in sheet form or in pieces. For example, when the fabric is supplied in sheet form wound on a tube, the fabric may be unwound, coated, dried, and then rewound onto another tube.

Suitable carbon-containing polymeric materials which may be used as the coating include thermoset precursors. Especially useful thermoset precursors may include phenolic, furan, oxidized polystyrene, polyvinyl alcohol, polyacrylonitrile, polyvinylidene chloride, cellulose, epoxy, polystyrene, polymethylmethacrylate, and polyimide compounds.

The carbon-containing polymeric material may be dissolved or dispersed in a diluent to assist in the coating procedure. Suitable diluents for the carbon-containing polymeric materials include ethyl alcohol, methyl ethyl ketone, and toluene. The carbon-containing polymeric material may be diluted to any concentration; however, a concentration of from about 5 to about 50 weight percent carbon-containing polymeric material is most desirable.

The carbon-containing polymeric material is coated onto the yarn strands or fabric at a level which typically results in from about 5 to about 15 weight percent add-on based on the original weight of the fabric material and after drying off the diluent.

After coating the yarn strands or fabric with a solution or dispersion of the carbon-containing polymeric material, the coated yarn strands or fabric are typically dried to remove the diluent. The drying may usually be performed at temperatures of from room temperature to about 100° C. for a period of time which depends on the temperature and the amount of diluent to be evaporated.

The coated carbon-fiber fabric is then molded to form relatively smoothly surfaced grooves therein. The coated fabric may be molded in heated dies which are adapted to form grooves in the top surface of the carbon-fiber fabric. In other words, the dies have projections in the top of the die which form grooves in the top surface of the fabric. The molding may be performed in any manner, including suitable continuous methods such as drum grooving and the like. In addition, grooves may be molded into the bottom surface of the fabric. The suitable molding temperatures for the dies is at least the curing temperature for the carbon-containing polymeric material used for coating. When phenolics are used as the carbon-containing polymeric material, the molding dies are typically heated to a temperature of from about 300° to about 375° F., preferably, about 350° F. When polyimide is used as the carbon-containing polymeric material, the molding temperature may be as high as 600° F.

FIG. 2 illustrates a fragment of grooved friction material 12 which was prepared by molding a coated piece of woven fabric 10 in a heated die as discussed above. The general shape of grooved friction material 12 is shown by dashed lines 26. Grooved friction material 12 has groove 28 in top surface 16 and protrusion 30 in bottom surface 18. Groove 28 has depth "d" and width $W_1$, and protrusion 30 has depth "d" and width $W_2$. Width $W_2$ is typically the total of $W_1$ plus 2d or less due to the molding process. Groove 28 is generally linear and is positioned in the direction of fill yarn strands 22. When used in friction engaging mechanisms (which will be discussed further hereinbelow), grooved friction material 12 is adhered at bottom surface 18 to a support member, leaving top surface 16 as the frictional surface which will face a cooperating member. It can be seen that, because of the molding process, grooved friction material 12 maintains a top surface of generally whole, undamaged or unlacerated yarn strands. The term "generally whole, undamaged" is used to mean that the yarn strands are substantially intact. Minor defects in the yarn strands, which are normal, may be present in the grooved friction materials of the present invention. In addition, minor yarn damage may be caused by the molding operation, for example, due to the stretching of the fabric. Generally, however, the integrity of yarn strands 20 and 22 is preserved in the present invention.

It is important to note that this method of grooving provides a material of higher strength and integrity than conventional grooved friction materials which were created by the material removal techniques of prior art methods. It can be seen that grinding or machining the grooves into the fabric will damage the yarns and substantially reduce the performance of the friction material fabric. Again, the prior art method of machining the grooves results in grooves that are not smooth enough to optimally allow oil flow thereover due to greater resistance. Inferior cooling capacity is experienced with machined grooves, while the molded grooves of the present invention allow free flow of the oil to optimize oil clearing capacity which aids heat extraction and lubrication.

Continuous-filament fabrics have best formability when the grooves are oriented in the fill direction, as shown in FIG. 2. However, the grooves may alternatively be in the warp direction or positioned at a 45° angle relative to the warp and fill directions, or the grooves may be in other patterns which would be readily determined by those skilled in the art.

In spun-yarn fabric, any groove pattern is possible as spun-yarn fabric has the stretching capability to accommodate any groove design. Non-woven fabrics may, too, have any groove pattern therein. In addition, due to their compressibility, non-woven fabrics may be molded with grooves in the top surface and no protrusions in the bottom surface.

Returning now to FIG. 2, grooved friction material 12 has protrusion 30 in bottom surface 18 (as mentioned) which was formed as a result of the molding process. Protrusion 30 is located opposite groove 28 (or "corresponds" to groove 28), as the molding process may result in forming grooves in the fabric material by the folding of the fabric in an accordion fashion. However, not all molding processes result in such protrusions in the fabric. It may be envisioned that the molding process may merely compress the yarns in the grooved area such that the bottom surface 18 remains substantially planar.

The grooved friction material, such as grooved friction material 12, is then heated to a carbonizing temperature in a non-oxidizing atmosphere to carbonize the carbon-containing polymeric coating on the carbon-fiber fabric. Suitable carbonizing procedures are taught in the first edition of the book, *Carbon-Carbon Composites,* by G. Savage (New York: Chapman & Hall, 1993), which book is incorporated herein by reference. The carbonizing temperature is preferably maintained until the carbon-containing polymeric material coating is carbonized. A typical carbonizing temperature is from about 800° C. to about 1200° C. A typical laboratory temperature profile would consist of heating at a linear rate of, e.g., 10° C./minute, holding for 2 hours at the carbonization temperature, followed by a linear cooling at around the same rate. A preferred non-oxidizing atmosphere is vacuum; however, gaseous atmospheres may be used which include natural gas and inert gases, such as nitrogen, hydrogen, helium, and combinations thereof. The carbonizing is performed to remove any hydrogen, oxygen, and nitrogen from the carbon-containing polymeric coating, leaving only carbon behind, thus creating a stronger final product. The grooved friction material remains porous, even after carbonization, and can be infiltrated and densified with pyrolytic carbon according to the next procedural step.

Densification of the grooved friction material, such as grooved friction material 12, may be performed in a furnace by well-known chemical vapor deposition (CVD) techniques or by a liquid-infiltration procedure which includes infiltrating the grooved friction material with a carbon source and, subsequently, carbonizing the infiltrated carbon source. The densification may be performed to any desired level of densification, so that the grooved friction material is at least partially densified. However, it is preferred that the densification be performed to the extent which results in the grooved friction material having a bulk density of from about 30 to about 65 percent of theoretical density for spun-yarn fabric, from about 45 to about 75 percent of theoretical density for continuous-fiber fabric, and from about 40 to about 80 percent of theoretical density for nonwoven fabric.

The various conditions for CVD densification techniques are set forth, e.g., in U.S. Pat. Nos. 4,766,013 and 4,883,686 and British Patent No. 1,455,891, which patents are incorporated herein by reference to teach CVD techniques. During densification by CVD, the grooved friction materials may be stacked one upon another or may be stacked with separators therebetween. Alternatively, the grooved friction materials may be suspended within the furnace on rods or hung from clips or the like.

The liquid-infiltration procedure for densifying the grooved friction materials is described in a co-pending U.S. patent application filed on Nov. 21, 1996, by Loren H. Uthoff, which application is incorporated herein by reference. In the co-pending patent application, a carbon fabric material is first coated with a carbon source and, subsequently, the coated carbon source is carbonized. Typically, the carbon source is a carbon-containing resin, selected from either thermoplastic and thermoset resins. Exemplary thermoplastic resins include polyetherether ketone, polyetherimide, and the various pitches, such as tar pitch, coal pitch, petroleum pitch, pine pitch, vegetable pitch, and wool pitch. Exemplary thermosetting resins include phenol resin and furan resin.

In the liquid-infiltration technique, the carbon source is coated onto the carbon fabric material in liquid form. The carbon source may be made into liquid form, for example, by admixing the carbon source with a liquid diluent and/or by melting the carbon source. Exemplary diluents for resins include carbon disulfide, caustic solutions, such as aqueous sodium hydroxide solutions, and organic solvents, such as benzene, nitrobenzene, acetone, ethers, including petroleum ether, chloroform, anthracene, alcohols including methanol, and water.

The liquid form of the carbon source may be coated onto the carbon fabric material at a level such that, after carbonization of the coating, the carbonized coated fabric material maintains some porosity.

After coating the fabric material, the coating on the fabric material is then carbonized by heating the coated fabric material to a carbonizing temperature, which is typically from about 800° C. to about 1200° C.

Preferably, the grooved friction material of the present invention exhibits a relatively open mesh, which is readily penetrated by an adhesive to improve bonding of the grooved friction material to a support surface. As mentioned above, when the fabric material used is spun-yarn fabric, the densified grooved friction materials typically have a bulk density of from about 30 to about 65 percent of theoretical density, which correlates to porosities of from about 70 to about 35 percent. When the fabric material used is continuous-filament fabric, the densified grooved friction materials typically have a bulk density of from about 45 to about 75 percent of theoretical density, which correlates to porosities of from about 55 to about 25 percent. When the fabric material used is nonwoven, the densified grooved friction materials typically have a bulk density of from about 40 to about 80 percent of theoretical density, which correlates to porosities of from about 60 to about 20 percent.

The densified grooved friction materials may be ready for bonding to the desired support member without further preparation. However, when the densified grooved friction materials have protrusions thereon, the protrusions may be removed by material removal techniques, thus smoothing bottom surface 18 to a generally flat shape, as shown in FIG. 3 for grooved friction material 14. The term "generally flat" is used to mean that there may be small deviations from perfectly flat. In FIG. 3, the general shape of grooved friction material 14 is shown by dashed lines 32, showing grooved top surface 16 and flat bottom surface 18. In addition, the bottom surface of the densified friction material of the present invention may be subjected to a material removal technique, such as grinding or machining, to smooth the surface whether or not there are protrusions thereon or the bottom surface may be subjected to a material removal technique only to the depth of the protrusions or beyond the depth of the protrusions. U.S. Pat. No. 4,778,548, which patent is incorporated herein by reference, teaches a suitable material removal technique for fabric materials.

Only the bottom protrusions may be removed or it may be helpful to remove more than just the bottom protrusions because manufacturing techniques may dictate that overall thickness is more effectively controlled by removing more than just the protrusions. For instance, meeting thickness tolerances in the final product may necessitate removal of more than just the protrusions. On the other hand, certain manufacturing techniques may only require the removal of the protrusions.

This machining of the bottom surface does not contradict the advantage of the undamaged yarns of the present invention because the bottom surface is bonded onto a desired support member and does not "perform" like the top surface. Therefore, machining the bottom surface may be the best preparation for adhering the fabric onto the support member. Moreover, roughening of the bottom surface may be found to be helpful for adhering the friction material to a substrate in order to form the resultant wet friction member. Depending upon the application, either a smooth or a roughened bottom surface may be desired. Roughening can be effected by machining, laser ablation, chemical abrasion or any other known method of material removal.

As can be seen in FIG. 3, the removal of the protrusions creates cut yarn strands 34 in bottom surface 18. Thus, bottom surface 18 of grooved friction material 14 is formed of both whole, undamaged yarn strands as well as damaged or cut yarn strands. When grooved friction material 14 is bonded to a support surface by applying adhesive between bottom surface 18 and the support surface, the integrity of bottom surface 18, which has been damaged by the removal of protrusions 30, is protected by being bonded to a support surface.

Because grooves are molded into grooved friction materials 12 or 14, damage to the yarn strands at the grooves does not occur or is minimal. In addition, because grooved friction materials 12 or 14 were densified after the grooves were formed therein, the grooved friction materials are substantially entirely coated with pyrolytic carbon created by the densification. The term "substantially entirely coated" is used to mean at least about 90% of the yarn surface is coated. The coverage of pyrolytic carbon coating of the grooved friction materials of the present invention differs from the grooved friction materials prepared by machining grooves in a previously-densified fabric material. By machining grooves in a previously-densified fabric material, some of the pyrolytic carbon is removed.

Figure 4:
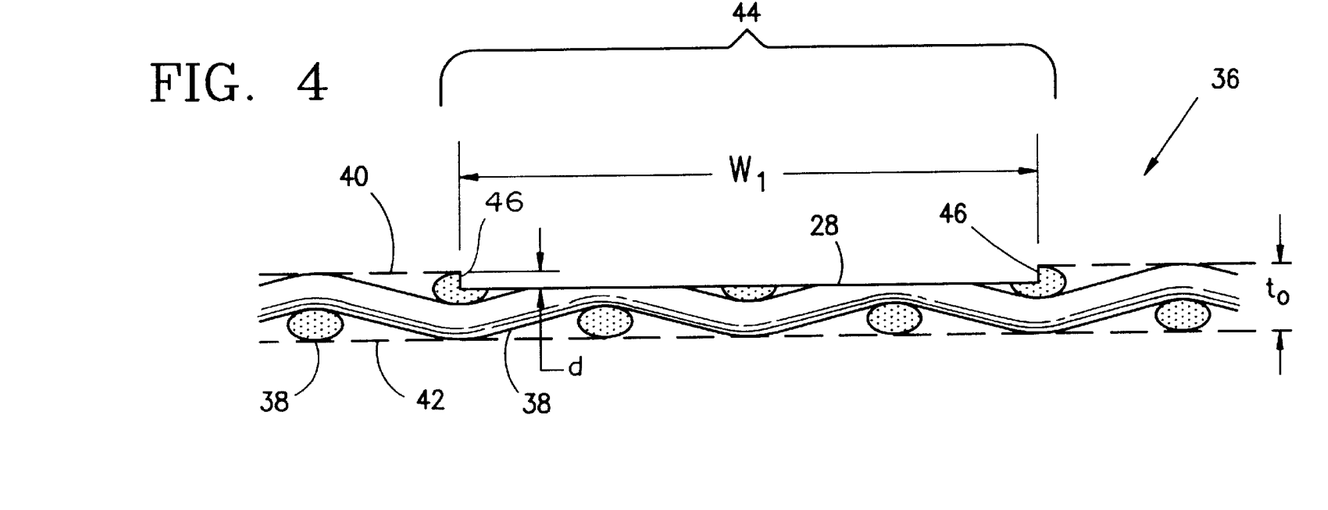
FIG. 4 is a greatly-enlarged cross-sectional view of a fabric material which has been grooved on the top surface by a material removal technique, such as grinding, in accordance with a prior art method.

In contrast to the present invention, FIG. 4 depicts grooved fabric material 36 having yarn strands 38, top surface 40, bottom surface 42, and groove 44 in top surface 40. Similar to grooved fabric materials 12 and 14, grooved fabric material 36 has thickness to, groove depth d, and groove width $W_1$. A major difference between grooved fabric material 36 and grooved fabric materials 12 and 14 is that grooved fabric material 36 has grooves which were formed by subjecting top surface 40 to a material removal technique, such as grinding, thus, damaging the yarn strands at groove 44. In the continuous-filament fabric, such as grooved fabric material 36, the material removal technique cuts the continuous yarn strands, typically, both the fill and the warp yarn strands, thus, greatly weakening the fabric material. Grooved fabric material 36 is especially weak at edges 46.

Even though grooved fabric material 36 is shown as a continuous-filament fabric, it could alternatively be either spun-yarn fabric or nonwoven fabric. In any type of fabric material, using the prior art method of grinding of the top surface creates damaged or lacerated yarn strands, so that the yarn strands are more cut after grooving than before grooving.

On the other hand, one embodiment of the present invention is a single-layer pyrolytic-carbon fabric material formed of yarn strands, which fabric material is grooved in the top surface yet maintains generally whole and undamaged yarn strands at the grooves. When grooves are molded into the bottom surface of the fabric material, the yarn strands at the grooves in the bottom surface are generally whole and undamaged as well.

The method of the present invention lends itself well to be a continuous production process. For example, on a continuously-moving belt, a piece of carbon-fiber fabric may first be sprayed with the carbon-containing polymeric material, then molded in preheated dies, then carbonized in a first furnace, then densified in a second furnace, then cooled, and, finally, cut to the desired sizes and shapes.

FIG. 5 shows a top plan view of a piece of grooved friction material 14 having generally linear grooves 28 thereon. The term "generally linear" is used to mean that small deviations from perfectly linear are possible. Arrows A—A show the warp direction, and arrows B—B show the fill direction. Typically, an adhesive is applied to bottom surface 18 (not shown in FIG. 5) and dried. One adhesive which is particularly suitable for use in the present invention is High-temperature Thermo-Set AF15 Adhesive, available from 3M Corporation, St. Paul, Minn. The adhesive works well when applied 0.003 inches thick and cured at a temperature of from 350° F. to 400° F. under a 150 psi load for one hour.

Figure 5A:
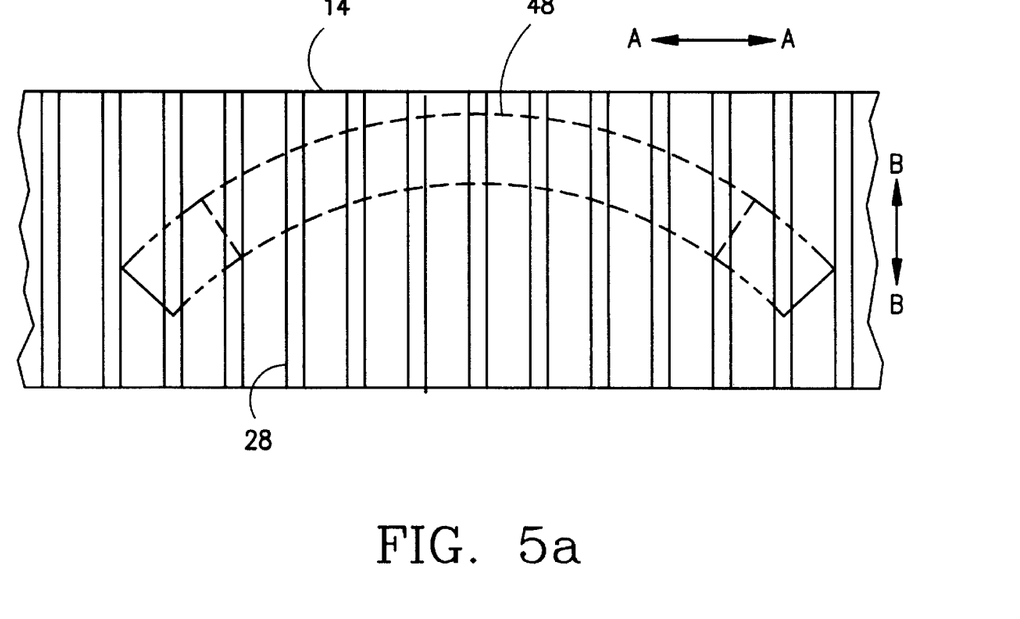
FIGS. 5a through 5d are top plan views of grooved friction materials according to the present invention which have various cutting patterns shown thereon.
Figure 5B:
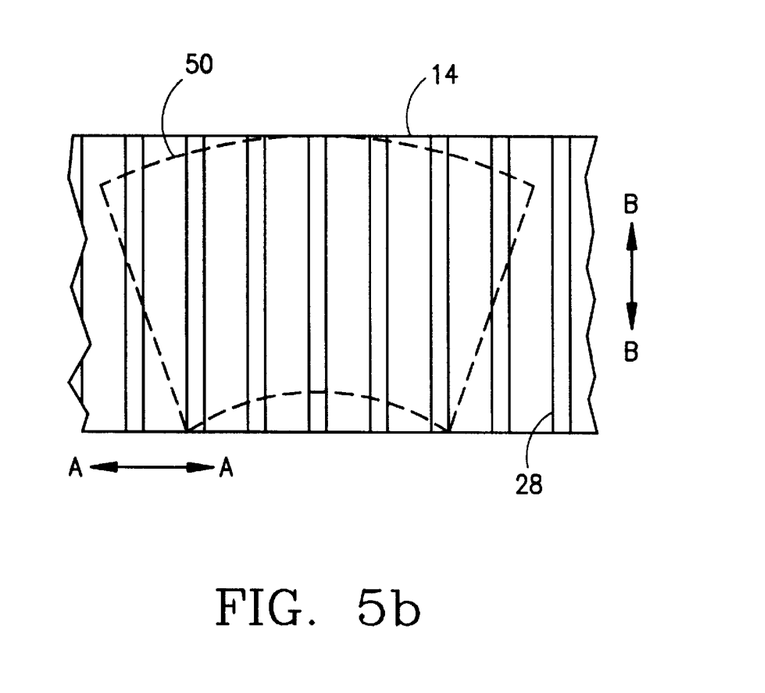
Figure 5C:
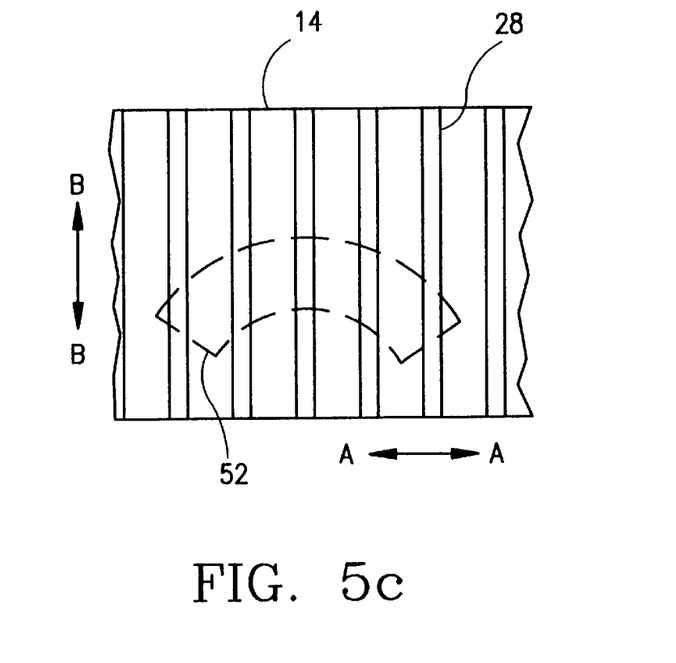
Figure 5D:
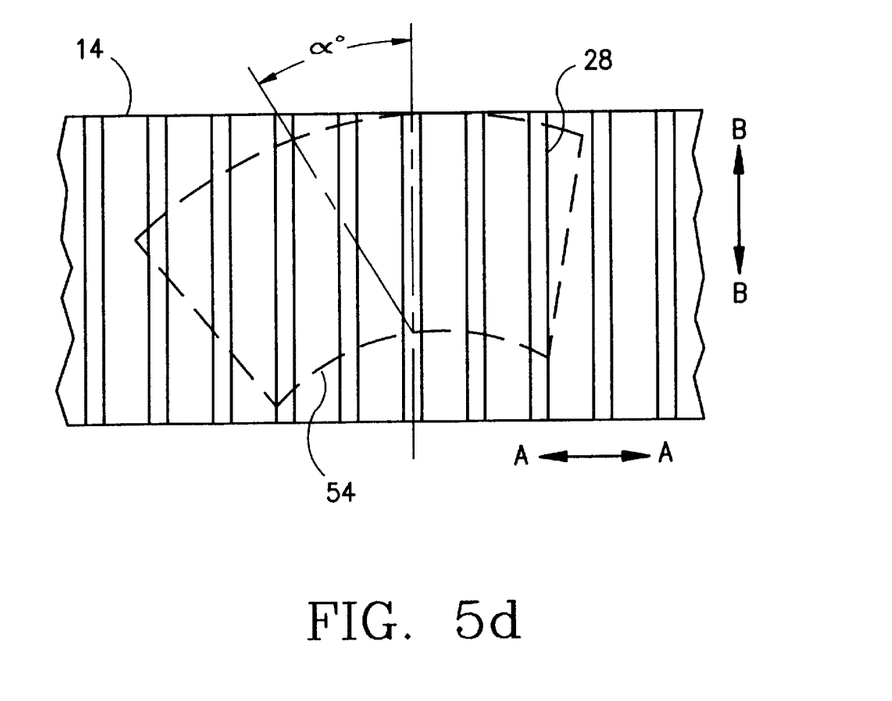
Figure 6:
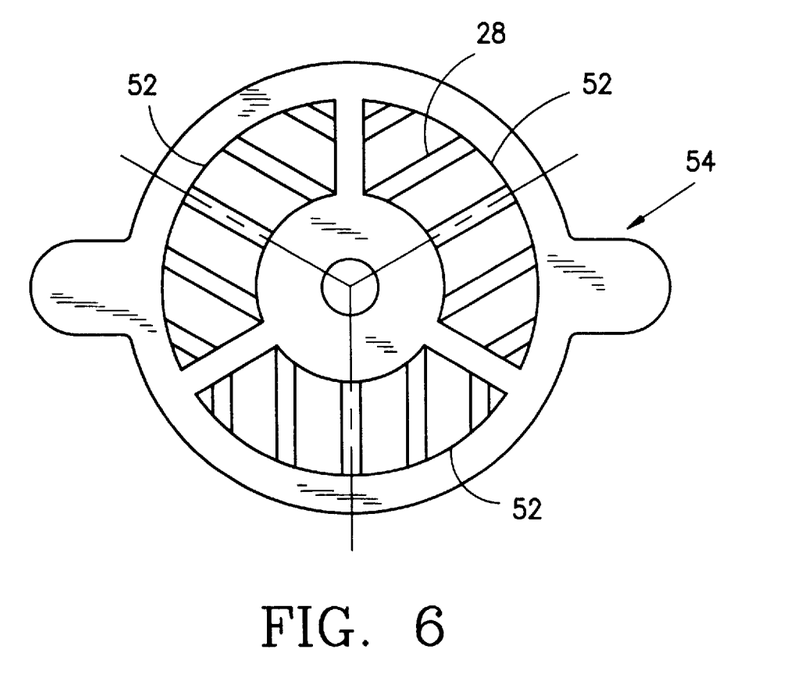
FIG. 6 is a top plan view of a differential clutch disk plate having grooved friction material thereon according to the present invention.

FIGS. 5a through 5d show suitable cutting patterns for preparing grooved friction material 14 for use. Cut piece 48 shown in FIG. 5a is cut on the radial and is later used on the transmission synchronizer cone of FIG. 7. Cut piece 50 shown in FIG. 5b is a wider piece, also cut on the radial, and several of these cut pieces 50 are shown later in FIG. 8 after they have been adhered to the friction plate 58. Referring to FIG. 5c, cut piece 52, cut on the radial for adherence to the differential clutch disk plate 54 of FIG. 6, is narrower. And finally, cut piece 54 shown in FIG. 5d is cut at an off-radial angle α and for use on friction plate 58 shown in FIG. 8b. The reason for the off-radial angle orientation will be discussed in more detail hereinbelow with reference to FIG. 8b.

The above-described material made in accordance with the present invention finds particular suitability when it is used on synchronizer cones (both with friction materials on the outer surface and on the inside), differential plates (either "rotor" or "stator"), clutch and brakes plate (such as the ones made by the Airplex Division of Eaton Corporation) and any other friction plates used by Caterpillar or Allison Corporations for transmissions, brakes, and retarders. In particular, the present invention is especially suitable for larger friction surfaces, such as heavy duty transmission synchronizers, which benefit from more rapid clearing of cooling fluids, while still needing the full integrity of the friction material surface to stay intact.

Figure 7:
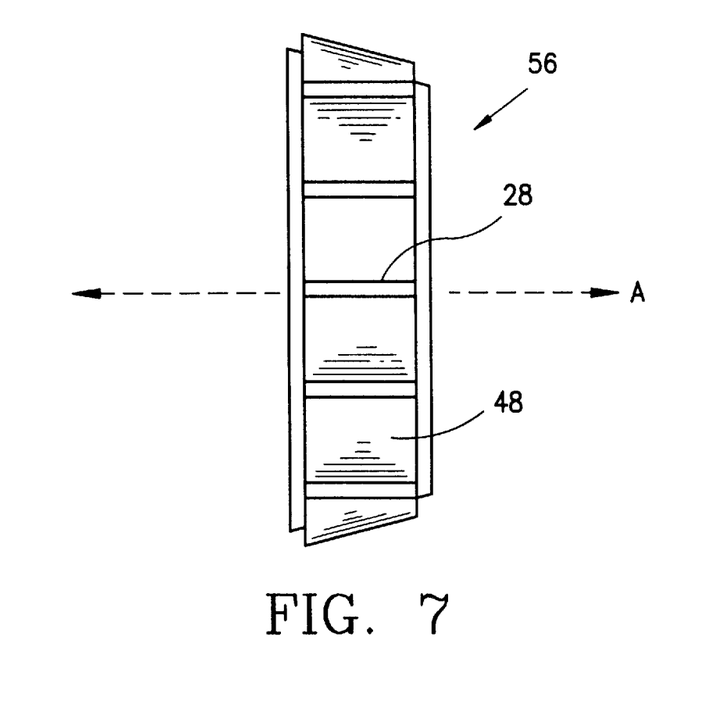
FIG. 7 is a side elevational view of a transmission synchronizer cone having grooved friction material thereon according to the present invention. The radial orientation of the grooved material from FIG. 5*a* is shown after the material has been adhered to the transmission synchronizer cone of FIG. 7.
Figure 8A:
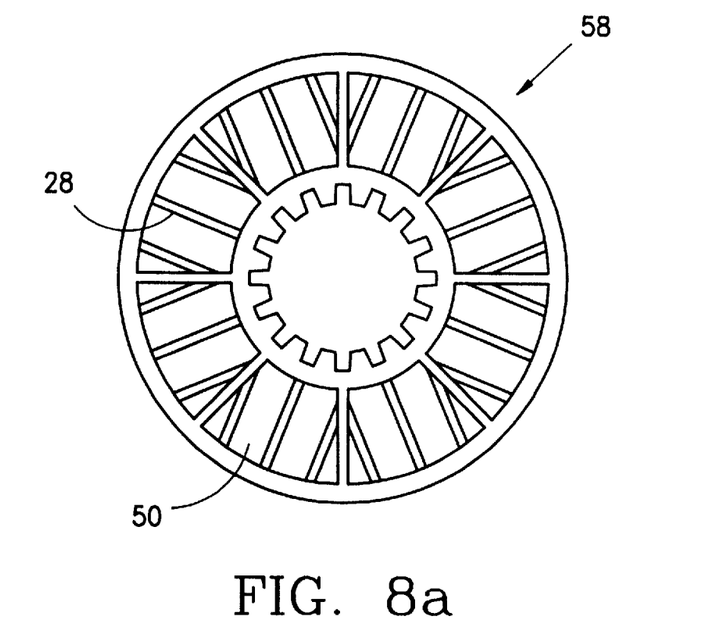
FIG. 8*a* is a top plan view of a friction plate having pieces of the grooved friction material adhered thereon with the grooves in a radial orientation according to the present invention.

FIGS. 6–8 show three different uses for grooved friction material 14. The three devices shown in FIGS. 6–8 are wet friction members for friction engaging mechanisms. Each wet friction member includes a support member, such as a plate or a cone, with the grooved friction material adhered thereon. In all of the wet friction members, the grooves on the grooved friction plate allow for rapid movement of oil to or from the friction interface and result in faster cooling or a quicker action (e.g. clutching, braking, accelerating, etc.) than is otherwise possible.

FIG. 6 shows typical differential clutch disk plate 54 with three segments 52 (from FIG. 5) adhered thereto. The center of each segment 52 is positioned 120° with respect to the adjacent segment. With the segments used in this manner, grooves 28 have a pseudo-radial orientation, although the grooves 28 may be beneficially adhered to the support member in an off-radial orientation from about 5° to about 65° off-radial.

FIG. 7 shows a typical transmission synchronizer cone 56 which is designed to matingly engage with another cone (not shown). Transmission synchronizer cone 56 has strip 48 of grooved friction material (from FIG. 5a) thereon. Strip 48 has grooves 28 of pseudo-radial orientation. The grooves are not exactly all parallel to the centerline A, although FIG. 7 depicts a nearly parallel arrangement. The cut material piece shown in FIG. 5a has been wrapped around the cone 56, and the most off-radial portion of piece 48 is on the reverse side. If desired, for a large synchronizer, two or more shorter strips of grooved friction material could be used on the synchronizer cone in place of the single strip to attempt to orient the grooves along the radial axis as best as possible. However, the grooves could be oriented in a specific off-radial or off-axis orientation to aid in more rapid clearing of the oil due to differential speeds of the two conical mating surfaces prior to engagement.

Figure 8B:
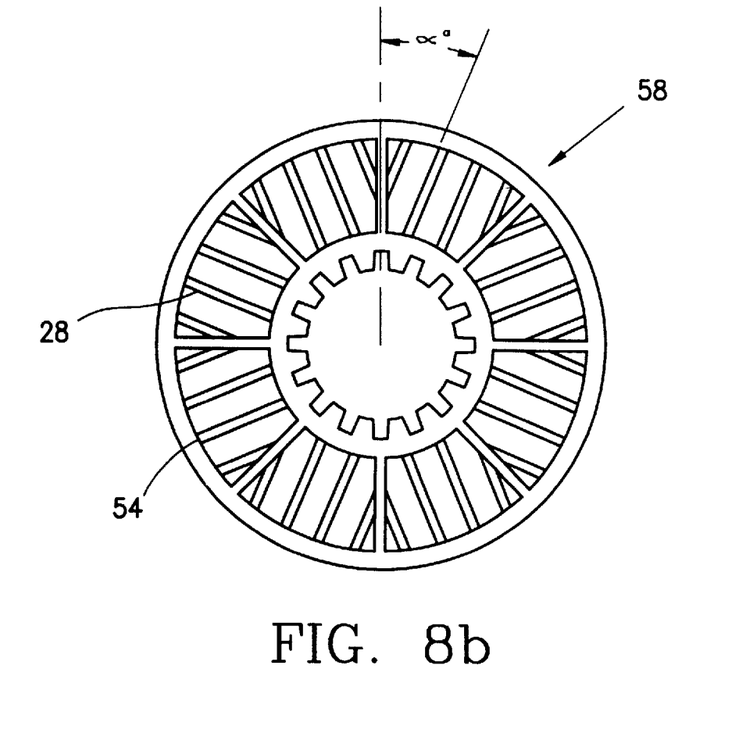
FIG. 8*b* is a top plan view of a friction plate having pieces of the grooved friction material, made in accordance with the present invention, being adhered thereon with the grooves being oriented at an angle with respect to the radial.

FIG. 8a shows a typical friction plate 58 such as is commonly used in automobile automatic transmissions, some truck transmissions, and brakes and clutches. Wedges 50 (from FIG. 5b) of frictional material 14 are bonded to either one or both surfaces of plate 58. The plate may be of the "rotor-type" with splines on the inner diameter (as shown) or the "stator type" with splines or ears on the outer diameter similar to FIG. 6. Wedges 50 have grooves 28 oriented in the pseudo-radial direction. Alternatively, the grooves may be oriented in any other desirable fashion, as shown in FIG. 8b. The cut grooved material pieces are oriented such that the axis of the groove in the adhered cut piece is placed at an off-radial angle α, which can be from about 5° to about 65°, depending on the desired effect. Looking at FIG. 8b, one can see that angle α is about 30° off radial, which is advantageous for allowing cooling fluid to exit the grooves in a more expeditious manner than if the grooves were oriented in the pseudo-radial position, due to the centrifugal force generated by rotation occurring during operation.

The desired effect of the off-radial orientation comes into play during the operation of the friction plate used in brakes, clutches and transmissions. This orientation can help to speed up the exit of the oil on and off the friction interface. As one can imagine, there would be a distinct advantage to constantly changing the interface oil in these wet friction applications. Stagnant oil will heat up, degrade and otherwise be undesirable. Rapid exchange of the oil or other cooling fluid can be optimized in part by using various off-radial angles best suited to each application and having smooth molded grooves, relative to the machined grooves.

The industrial applicability of the present invention includes any use of the grooved friction material, e.g., in wet friction engaging mechanisms. The grooved friction material provided may be adhered to a support member to form a wet friction member which is part of a wet friction engaging mechanism. Such wet friction members include cones, such as transmission synchronizer cones, and plates, such as retarder plates, differential plates, clutch plates, transmission plates, and brake plates. The wet friction members are also part of the present invention. The present invention also provides a method for making the grooved friction materials.

I claim:

1. A grooved friction material comprising a single-layer pyrolytic-carbon fabric material formed of woven or nonwoven yarn strands and having a top surface and a bottom surface, the top surface having grooves therein, the yarn strands surrounding the grooves in the top surface being generally whole, undamaged yarn strands.

2. The grooved friction material according to claim 1, wherein the pyrolytic-carbon fabric material is substantially entirely coated with pyrolytic carbon.

3. The grooved material according to claim 1, wherein the fabric material is at least partially densified to a bulk density of from about 30 to about 80 percent of theoretical density.

4. The grooved material according to claim 1, wherein the material is at least partially densified by chemical vapor deposition.

5. The grooved material according to claim 1, wherein the material is at least partially densified by liquid infiltration.

6. The grooved friction material according to claim 1, wherein the fabric material is a woven fabric material selected from the group consisting of continuous-filament fabric, spun-yarn fabric, and combinations thereof.

7. The grooved friction material according to claim 1, wherein the bottom surface has grooves therein and the yarn strands at the grooves are generally whole, undamaged yarn strands.

8. The grooved friction material according to claim 1, wherein the bottom surface is generally flat.

9. The grooved friction material according to claim 1, wherein the bottom surface is generally flat and is formed of both whole, undamaged yarn strands and damaged yarn strands.

10. The grooved friction material according to claim 1, wherein the bottom surface is generally flat and roughened.

11. The grooved friction material according to claim 1, wherein the yarn strands forming the fabric material include fill yarn strands and warp yarn strands and the grooves in the top surface are generally linear and are positioned in a direction selected from the group consisting of the direction of the fill yarn strands, the direction of the warp yarn strands, and 45° relative to the direction of the warp and the fill yarn strands.

12. A wet friction member for friction engaging mechanisms, comprising:
    a support member; and
    at least one piece of grooved friction material adhered to a surface of the support member, the friction material being a single-layer pyrolytic-carbon fabric material formed of yarn strands and having a top surface and a bottom surface, the top surface having grooves therein and being formed of generally whole, undamaged yarn strands.

13. The wet friction member according to claim 12, wherein the pyrolytic-carbon fabric material is substantially entirely coated with pyrolytic carbon.

14. The wet friction member according to claim 12, wherein the fabric material is at least partially densified to a bulk density of from about 30 to about 80 percent of theoretical density.

15. The wet friction member according to claim 12, wherein the material is at least partially densified by chemical vapor deposition.

16. The wet friction member according to claim 12, wherein the material is at least partially densified by liquid infiltration.

17. The wet friction member according to claim 12, wherein the fabric material is a woven fabric material selected from the group consisting of continuous-filament fabric and spun-yarn fabric.

18. The wet friction member according to claim 12, wherein the bottom surface of the fabric material has grooves therein and the yarn strands at the grooves are generally whole, undamaged yarn strands.

19. The wet friction member according to claim 12, wherein the bottom surface of the fabric material is generally flat.

20. The wet friction member according to claim 12, wherein the bottom surface of the fabric material is generally flat and is formed of whole, undamaged yarn strands and damaged yarn strands.

21. The wet friction member according to claim 12, wherein the bottom surface is generally flat and roughened.

22. The wet friction member according to claim 12, wherein the yarn strands forming the fabric material include fill yarn strands and warp yarn strands and the grooves in the top surface of the fabric material are generally linear and are positioned in a direction selected from the group consisting of the direction of the fill yarn strands, the direction of the warp yarn strands, and 45° relative to the direction of the warp and the fill yarn strands.

23. The wet friction member according to claim 12, wherein the support member is selected from the group consisting of plates and cones.

24. The wet friction member according to claim 21, wherein the plates are selected from the group consisting of retarder plates, differential plates, clutch plates, transmission plates, and brake plates.

25. The wet friction member according to claim 21, wherein the friction material is adhered to the support member such that the grooves in the material are in an off-radial orientation with respect to the radii of the support member at an angle of from about 5° to about 65° to help clearing of cooling fluids.

26. A method for making a grooved friction material, comprising the steps of:
    molding a carbon-fiber fabric containing a carbon-containing polymeric material, the molding being performed in a die adapted to form grooves in the top surface of the carbon-fiber fabric;
    carbonizing the molded carbon-fiber fabric; and
    at least partially densifying the carbonized carbon-fiber fabric with pyrolytic carbon.

27. The method according to claim 24, wherein the step of molding is accomplished in a continuous manner.

28. The method according to claim 24, wherein the step of molding is accomplished by drum grooving.

29. The method according to claim 24, further comprising, prior to the molding step, coating the carbon-fiber fabric with the carbon-containing polymeric material.

30. The method according to claim 24, wherein the molding is performed on a single layer of carbon-fiber fabric.

31. The method according to claim 24, wherein the carbon-fiber fabric material is a woven material selected from the group consisting of continuous-filament fabric and spun-yarn fabric.

32. The method according to claim 24, wherein the yarn strands forming the carbon-fiber fabric material include fill yarn strands and warp yarn strands and the molding forms generally linear grooves in the top surface which are positioned in a direction selected from the group consisting of the direction of the fill yarn strands, the direction of the warp yarn strands, and 45° relative to the direction of the warp and the fill yarn strands.

33. The method according to claim 24, wherein the molding forms protrusions in the bottom surface of the carbon-fiber fabric, the protrusions corresponding to the grooves in the top surface of the carbon-fiber fabric, and the method further comprises removing a portion of the bottom surface including at least the protrusions from the bottom surface of the carbon-fiber fabric.

34. The method according to claim 23, wherein removing a portion of the bottom surfaces involves removing material from the carbon-fiber fabric only to the depth of the protrusions.

* * * * *